June 4, 1935.  W. T. BORN  2,003,780

SEISMIC SURVEYING

Filed Nov. 24, 1933

INVENTOR
William T. Born
BY
Kenyon & Kenyon
ATTORNEYS.

Patented June 4, 1935

2,003,780

UNITED STATES PATENT OFFICE 2,003,780

SEISMIC SURVEYING

William T. Born, Tulsa, Okla., assignor to Geophysical Research Corporation, New York, N. Y., a corporation of New Jersey Application November 24, 1933, Serial No. 699,483

7 Claims. (Cl. 181—0.5)

This invention relates to seismic surveying and has for an object a new and improved method of receiving and recording waves produced by detonation of a charge of explosive in the earth at a point near its surface and transmitted through the earth from the shot point to a sub-surface formation from which the waves are reflected to the receiving point.

Heretofore, in the exploration of underground structures by reflected waves, it has been customary to receive the reflected waves at a point located an appreciable distance from the shot point. The reason for this prior practice lies in the fact that waves travel along other paths from the point of explosion to the receiving point and until such waves have traveled a considerable distance along the earth's surface, the amplitude thereof is too great for satisfactory recording on the same apparatus by which the reflected waves are recorded. In order for the reflected waves to be distinguished on the trace produced by the recorder, it is necessary that the amplitude of the reflected waves be generally comparable to the amplitude of the other waves. However, even under such conditions, a considerable amount of interfering energy is present and the accuracy of the observation is oftentimes greatly impaired.

According to the present invention, the above difficulties are overcome by placing the wave receiver closely adjacent to the shot point. This arrangement eliminates the large number of wave paths incident to prior practice. The only energy effecting the wave receiver is the explosion itself and the energy which has traveled down to and has been reflected from the sub-surface formations being investigated. The direct pulse from the explosion, although of tremendous amplitude, as compared to the reflected energy, is of very short duration and will have passed beyond the receiver before the reflected energy arrives at the receiver. Due to the large amplitude of the explosion, it is desirable to protect the recording equipment from overload in order to prevent damage to it and insure proper operation of the recording equipment when the reflected energy arrives at the receiver. The recording equipment may be protected from overload by reducing the sensitivity thereof to a low value at the time of the shot and increasing its sensitivity prior to the time of arrival of the reflected energy.

Other objects, novel features and advantages of this invention will be apparent from the following specification and accompanying drawing, wherein.

Figure 1:
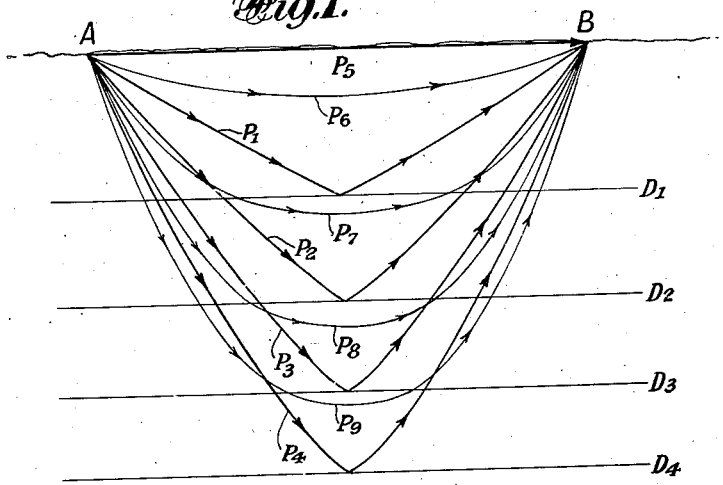
Fig. 1 is illustrative of the arrangement of the shot point and recording position hitherto employed in seismic surveying and also illustrates the various possible paths over which energy may travel from the shot point to the recorder.

In Fig. 1, A denotes the shot point and B denotes the point at which the reflected waves are received and recorded according to prior practice, these points being usually spaced several hundred or more feet apart. The lines $D_1$, $D_2$, $D_3$ and $D_4$ denote elastic discontinuities in the earth's sub-surface which discontinuities are here indicated as being abrupt but which actually may be regions in which the elastic properties of the earth vary rapidly with depth. The lines $P_1$, $P_2$, $P_3$ and $P_4$ denote the paths traveled by the reflected waves, the time of travel of which is recorded and utilized in the determination of the depth of the discontinuities. The line $P_5$ denotes the path of the surface wave traveling directly from the shot point to the recording position along the earth's surface while the lines $P_6$, $P_7$, $P_8$ and $P_9$ indicate possible refraction paths over which waves may travel between the shot point A and the receiving position B. In sub-surface exploration by reflected waves, the presence of refracted waves tends to obscure the record of the reflected waves and render it difficult to determine accurately the travel time of the reflected waves.

Figure 2:
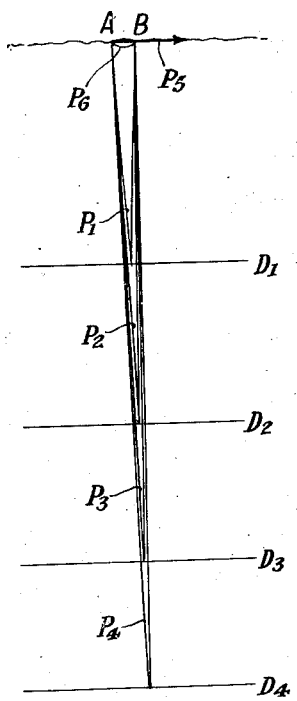
Fig. 2 is a similar view illustrative of the arrangement of shot point and recording position for practicing the present invention and is illustrative of the paths traversed by the waves to be recorded.

According to the present invention, the receiving position B is so arranged with respect to the shot point A that the refraction paths are eliminated or rather they are made to coincide with the reflection paths. As shown in Fig. 2, the receiving point B is placed as close to the shot point A as is practical. It is to be understood that the point B is spaced from the point A a matter of only a few feet and that the distance between the points A and B is negligible in comparison with the length of the paths traversed by the reflected waves. The reflection paths are made to coincide substantially with the reflections $P_1$, $P_2$, $P_3$ and $P_4$. Strictly speaking, the reflection and refraction paths will coincide only if the points A and B coincide, but with A and B in close proximity they coincide to all practical purposes. The direct path $P_5$ still remains and energy arriving over this path reaches the recording position almost simultaneously with the detonation of the shot and has passed beyond the recording position by the time the reflected waves arrive at such position. Thus, the only energy arriving at the receiving point is the direct pulse from the explosion and energy which has passed down to and has been reflected from the sub-surface discontinuities. The direct wave is of much greater amplitude than the reflected wave and if applied to the recorder may overload the same and prevent proper recording of the reflected waves. Therefore, means are provided to reduce the sensitivity of the recorder or even render it inoperative at the time of detonation and restoring it to operating condition before the arrival of the reflected waves.

Figure 3:
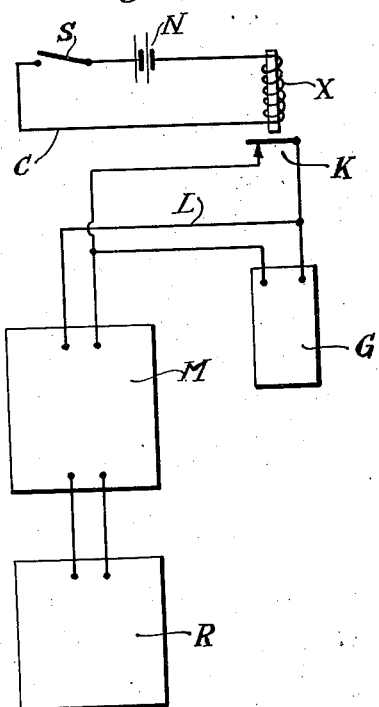
Fig. 3 illustrates diagrammatically one arrangement of apparatus which may be used for recording reflected waves.

Fig. 3 discloses diagrammatically a simple and satisfactory arrangement of apparatus which may be used in the practice of this invention. An electrical seismometer G is arranged in the earth's surface at the receiving point B and is connected by the circuit L with an amplifier M, the output of which feeds into a recorder R. A circuit C comprises a normally open switch S mounted upon the detonator (not shown) used to fire the shot in such manner that the switch is closed at the instant that the charge is detonated, the circuit being completed through a battery N and the field winding of a retarded relay X. The movable and stationary contacts of the relay K are connected in shunt with the seismometer G and constitutes a short circuit for the same when the contacts are closed.

Normally, the switch S is open and the relay contacts are closed to short circuit the seismometer. At the instant of detonation of the charge, the switch S is closed, thus energizing the relay and causing the contacts to open after a short period of time during which the direct energy from the explosion has passed beyond the geophone. During the time that the relay contacts are closed, the seismometer is short-circuited and the recorder is inoperative. The short-circuiting circuit is opened before the reflected waves arrive at the seismometer so that the reflected waves are recorded in the normal manner. The reflected waves are received and recorded independently of any other waves and an accurate observation of the travel time of these waves is insured.

It is of course apparent that other means may be used to render the recorder inoperative until the direct energy has passed beyond the seismometer and to render the recorder operative prior to the arrival of the reflected waves. For example, the recording apparatus might be provided with a manually operated switch which could be actuated by an attendant at a predetermined interval after the detonation of the explosive.

It is to be understood that the various modifications may be made without in any way departing from the spirit of the invention as defined in the appended claims.

I claim:

1. The method of seismic surveying which comprises detonating a charge of explosive at a point near the earth's surface, receiving waves thus formed at a single point near the shot point and recording only waves received at said point after reflection from a sub-surface formation.

2. The method of seismic surveying which comprises detonating a charge of explosive at a point near the earth's surface, receiving waves thus formed at a point near the shot point, impressing received waves on a recorder and rendering the recorder inoperative until after the direct waves have passed beyond the receiving point.

3. The method of seismic surveying which comprises detonating a charge of explosive at a point near the earth's surface, receiving the waves thus formed at a single point sufficiently near the shot point that the direct waves have passed completely beyond said point before waves reflected from a sub-surface formation reach said point and recording only the waves received at said point by reflection.

4. The method of seismic surveying which comprises detonating a charge of explosive at a point near the earth's surface, receiving the waves thus formed at a point sufficiently near the shot point that the direct waves have passed completely beyond said point before waves reflected from a sub-surface formation reach said point, impressing received waves upon a recorder and maintaining the recorder in inoperative condition until after the direct waves have passed beyond the receiving point.

5. The method of seismic surveying which comprises detonating a charge of explosive at a point near the earth's surface, receiving waves thus formed at a single point near the shot point and impressing on a recorder only waves received at said point by reflection.

6. The method of seismic surveying which comprises detonating a charge of explosive at a point near the earth's surface, receiving waves thus formed at a single point sufficiently near the shot point that the direct waves have passed completely beyond said point before waves reflected from a sub-surface formation reach said point, and impressing on a recorder only waves received at said point by reflection from a sub-surface formation.

7. The method of seismic surveying which comprises detonating a charge of explosive at a point near the earth's surface, receiving waves thus formed by a single detector located at a point sufficiently near the shot point that direct waves have passed completely beyond said point before waves reflected from a sub-surface formation reach said point, impressing the detector output upon a recorder and rendering the recorder inoperative until after the direct waves have passed beyond said receiving point.

WILLIAM T. BORN.